3,018,260
ROOM TEMPERATURE CURING MOLDING AND
FORMING COMPOSITION
Albert M. Creighton, Jr., Manchester, Mass., assignor to
Chemical Development Corporation, Danvers, Mass.,
a corporation of Massachusetts
No Drawing. Filed Sept. 29, 1958, Ser. No. 763,847
2 Claims. (Cl. 260—18)

This invention relates to materials for quick fabrication of quasi-metallic articles such as screws, tools, jigs, dies, molds, molded articles, models, work holders and the like, to materials for preparation of molded articles, and to materials for repair and change of previously fabricated articles. This application is a continuation-in-part of my prior copending application Serial No. 479,678, filed on January 3, 1955, now abandoned.

In one aspect this invention relates to a process of compounding such materials and forming articles therefrom. In still another aspect, this invention relates to the articles themselves after fabrication.

A principal object of this invention is the provision of a highly plastic material which can be easily handled and shaped in the formation stage, but which will harden without running or sagging into an impervious, strong and inert article. Another object of this invention is the provision of such a material which will harden without application of heat and pressure and without shrinking or expanding. Still another object of this invention is the provision of such a material which will at one and the same time be light in weight, have extremely good properties of cohesion to surfaces, have a long storage life, have high heat resistance, and which may be plated by conventional techniques.

Other objects of this invention relating to the process thereof include the sequence of steps of compounding the material, and the use thereof in forming articles. Still further objects of this invention are the provision of quasi-metallic articles having unusual properties of strength, durability, inertness, electrical resistance and platability.

In the accomplishment of these and other objects of this invention in a preferred embodiment thereof, I compound as a starting mixture for the material of my invention 500 parts by weight of epoxy resin, mixed with 1500 parts by weight of finely divided steel, and a thickening agent which may be 90 parts by weight of finely divided, high surface area silica. These substances are thoroughly mixed and result in a heavy, putty-like mass. When it is desired to fabricate or mold articles out of the material, a curing and preparing agent is added thereto containing a mild base such as an amine, an internal plasticizer such as Poylamid, and an additional quantity of thickening agent. The base reacts with the epoxy resin causing the same to polymerize, and the material gradually hardens without expanding or contracting. In the preferred embodiment the curing and preparing agent is added on a ratio of one part agent to 9 parts by weight of the first named mixture.

It is a feature of my invention that articles formed with this material have many properties of strength, durability and resistance to shock of a solid metal but are highly inert and electrically resistant.

Another feature of my invention lies in its ability to be handled and shaped after the curing agent has been added. It remains firm but malleable for a substantial time and reaches the hardened state after several hours at room temperature.

Other features of my invention relate to the quantity relationship between the various ingredients. A maximum of finely divided metal is employed for strength purposes, and the quantity of the thickening agent is gauged to render the material only sufficiently soft to permit ready mixing. Thereafter the ingredients of the curing and preparing agent are such that the resulting material is sufficiently malleable to be formed but still has sufficient rigidity to remain in a formed position without additional support. The quantity of the plasticizer also bears a definite relationship to the other materials because it does not render the material too soft prior to curing but does impart a toughness to the final article which gives it desirable anti-shattering and strength properties.

A further feature of my invention in a second embodiment thereof relates to a more fluid material which may be poured into molds and the like. This material has the same ingredients as the previously mentioned embodiment but omits the additional thickening material in the curing and preparing agent. In this way the starting mixture is transformed from a relatively stiff, putty-like mixture to a more fluid substance which can be readily poured.

One feature of my invention relates to the mixture of the finely divided metal and the epoxy resin in the formation of thick particles as distinguished from coatings. The polymerization of the resin results in an exothermic reaction which ordinarily is deleterious in relatively thick articles because the resin itself is a poor conductor of heat. The metal particles, however, in the high proportion as employed herein serve as conductors of the heat from the internal portions of the mass to the surface thereof, thus avoiding the harmful effects of the heat of polymerization.

Further objects and features of my invention will best be understood and appreciated from a detailed description of preferred embodiments thereof, selected for purposes of illustration, and described in detail as follows.

The starting resin employed in my invention is an epoxy resin which may be characterized in that it is synthetic, organic, polymeric, and possesses terminal epoxide groups. Once it has polymerized it is infusible and substantially insoluble. More specifically it is a condensation product of an epihalogenohydrin and a bis-phenol which I understand may be Bis-phenol A which is bis(4-hydroxyphenyl)dimethyl methane or Bis-phenol F which is 4,4' dihydroxy biphenyl methane. When I employ herein the term "epoxy resin" I intend to include all resins of this type.

In compounding the starting mixture in one embodiment of my invention, I add to 500 parts by weight of epoxy resin, approximately 1500 parts by weight of finely divided metal which may be steel, iron, copper, lead, aluminum, or the like and may be in the form of shavings, wires, foil, particles, etc., the size and shape thereof being only consistent with the need for mixability. I have found that this ratio of resin to metal is desirable for reasons of strength and durability of the finished article. However, such a mixture is too fluid for easy handling, and therefore, I add to it 90 parts by weight of a thickening agent, which may be an amorphous silica as obtained by vapor phase hydrolysis of silicone tetrachloride or silicone tetrafluoride, which is sold by the Godfrey L. Cabot Company under the trade name of "Cabosil." Another thickening agent that may be used is "Santosel" sold by the Monsanto Company. "Santosel" is likewise a finely divided silica but it has a small quantity of air trapped as part of the gel structure, and therefore, is not quite as desirable as the "Cabosil." It will be understood, however, that other thickening agents, such as finely divided carbon black and the like may be employed.

Thus, the starting mixture includes epoxy resin, finely divided metal, and a thickening agent, and has a consistency somewhat like putty. However, it may be troweled, formed, and shaped, and also it is sufficiently soft to permit mixing further substances into it without difficulty.

When one desires to form articles out of the material of my invention, the starting mixture is combined with a curing and preparing agent which includes 50 parts by weight of "Polyamid," 30 parts by weight of a polyamine such as diethylene-triamine and 9 additional parts by weight of thickening agent. I understand "Polyamid" to be a product of the General Mills Inc., of Kankakee, Illinois. I understand it to designate a group of essentially amber colored, thermoplastic polymers with molecular weights ranging from 3,000 up to 10,000. They are prepared by the condensation of an unsaturated fatty acid as for example dilinoleic acid with a polyalkyl amine such as ethylene diamine. The curing and preparing agent is added to the starting mixture in a ratio of one part by weight of curing and preparing agent to 9 parts by weight of starting mixture. These materials are thoroughly blended and the polyamine being a mild base combines with the epoxy resin forming long chain molecules, thus causing the same to cure. The "Polyamid" also combines chemically and blends throughout the structure rendering the finished product tough and durable, and the additional thickening agent maintains the consistency of the starting mixture sufficiently stiff to permit the final mixture to hold its shape without sagging while the material cures. It will be understood that the polyamine is a room temperature curing agent, and that, while the "Polyamid" also contributes to curing the epoxy resin, the curing action of the "Polyamid" is slow and relatively incomplete at room temperature unless accompanied by the polyamine. This is why I refer herein to the "Polyamid" both as a toughening agent and an internal plasticizer.

It should not be considered that "Polyamid" is the only internal plasticizer that may be employed in overcoming the brittleness of the finished product. Other substances having essentially the same characteristics of toughness and compatibility with the epoxy resin as "Polyamid" are equally usable. For instance, a polysulfide material such as "Thiokol" may be employed, but such other substances are not as compatible with the epoxy resin as "Polyamid." "Thiokol" is an organic polysulfide liquid polymer sold by the Thiokol Corporation of Trenton, New Jersey. I understand it to be a liquid polythiodithiol polymer of low molecular weight prepared from 98 mole percent of bis (2-chloroethyl) formal and 2 mole percent of tri-chloropropane. A suitable alterenate is "Rosin Amine D." "Rosin Amine D" is a product of the Hercules Powder Co. of Wilmington, Delaware, and is more particularly identified as dehydroabiethylamine. The reaction of the "Thiokol" and the "Rosin Amine D" with the epoxy resins is substantially the same as that of the "Polyamid." They react slowly and relatively incompletely at room temperatures, but combine properly at room temperature as internal plasticizers when accompanied by aliphatic amines, such as diethylene triamine, ethylene diamine, 3-diethyl amino propylamine, or triethylene tetramine, all of which function properly in my invention.

With epoxy resins, polymerization is an exothermic reaction and since the resin itself is a poor conductor of heat, extreme temperatures may be reached in the interior of thick items as distinguished from coatings. This fact might lead to harmful results if it were not for the presence of a high percentage of metal particles in the material serving substantially to conduct the heat from the interior portions of the formed articles to the surfaces thereof. For instance, excessive heat causes the resin to be more fluid during curing. Also heat can result in a destruction of the resin and cause bubbles to form internally of the structure. Furthermore, excessive heat can speed up polymerization and thereby cause the material to shrink. These factors lead to an undesirable distortion of the finished product. Epoxy resins will normally shrink in the neighborhood of 1% during curing, but with the combination of a high percentage of metal particles as in my invention, shrinkage is cut down to a practically negligible figure. My material only shrinks approximately .023% and while I attribute this unexpected result to the heat transfer of the metal, it may also be due to the compressive strength of the metal in holding the resin against shrinking. Thus, I consider the combination of the epoxy resin and the high percentage of metal as a substantial contribution of my invention, and therefore, I intend to claim it broadly herein.

A second embodiment of my invention is adapted particularly for making molded articles, and I employ the same starting mixture as in the embodiment outlined above. However, the curing and preparing agent in this embodiment omits the 9 parts of thickening agent. When this is done, the combined mixture softens rapidly during the intermixing stage and eventually results in a substantially fluid substance which may be readily poured into molds or onto surfaces in liquid form.

In carrying out the process of my invention for the formation of molds, molded articles and the like where it is desired to have the material of my invention take the shape of a given article, but not to adhere to the same, I apply a suitable mold release compound to the surface of the article prior to applying the material of my invention. On the other hand, it will be understood that the material of my invention has remarkable properties of cohesion to numerous substances, such as wood, plastic, metal and the like when used without application of a mold release compound, and therefore, the substance is an excellent medium for repairing or altering previously fabricated articles.

Once the material of my invention has been cured, it has a number of remarkable properties as follows: Tensile strength, 10,000 p.s.i.; compressive strength, 15,000 p.s.i.; flexural strength, 13,000 p.s.i.; impact strength, foot pounds per inch of notch, Izod 0.7–0.8; Rockwell Hardness F Scale 75; coefficient of thermal expansion $25 \times 10^{-6}$ inch/inch/°C.; solids, 100% (i.e. 100% free of volatiles). It can be sawed, drilled, tapped, threaded, ground, milled, planed, broached, etc. with conventional metal working equipment. No heat or pressure is required in the formation of articles with it; it is impervious; and it is extremely resistent to many solvents, oils and other chemicals. The metal particles give it a high resistance to abrasion. An extremely wide variety of metallic items may be manufactured with it, such as jigs, fixtures, forming dies, holding devices, models, molds, etc.

One of the problems presented in compounding the material of my invention relates to the tendency of the metal particles to settle in the epoxy resin and an important function of the thickener in the starting mixture is to prevent this from happening. In the proportions given in the preferred embodiment herein described, the starting mixture has a minimum shelf life of twelve months under normal conditions. For the best conditions the thickening agent must be present in sufficient quantity to hold the metal particles in suspension but not to render the material too stiff for convenient mixing with the curing and preparing agent.

Specific examples of the composition of my invention are as follows.

*Example No. 1 (parts by weight)*

20 parts of Epon 828 were mixed with 75 parts of steel powder and 5 parts of Cabosil. Epon 828 is an epoxy resin product of the Shell Chemical Company and is the reaction product of epichlorohydrin and Bisphenol A. Cabosil is an amorphous silica thickening agent sold by the Godfrey L. Cabot Co. of Boston, Massachusetts. To the above mixture was added a hardening mixture comprising 3 parts of diethylene triamine, 5.5 parts of Polyamid and 1 additional part of Cabosil. The Polyamid was the condensation product of dilinoleic acid and ethylene diamine.

This product cured in about 1 hour at room temperature. It exhibited a linear shrinkage of .023%, a hardness of approximately 95 (as determined by means of a Barcol 935 GYZ Impressor). Its coefficient of thermal expansion was $25 \times 10^{-6}$ inch/inch/°C., and its maximum exothermic temperature in a semi-cylindrical test mold 4.4 inches long and having a radius of 1 inch was 100° C.

Prior to curing, the mixed mass was trowelable and would hold its shape once formed. It adhered to vertical surfaces during curing, and after curing adhered strongly to a wide variety of types of surfaces under changing conditions of temperature. It had excellent thermal resistance and could be employed in repairing engine blocks. In addition, it could be molded in thick masses, and once molded presented excellent machineability properties. Prior to mixing in the hardening agent, the mixture of resin, metal and thickener exhibited a substantially indefinite shelf life.

*Example No. 2*

In Example No. 2 the same ingredients set forth in Example No. 1 were employed except that the additional 1 part of Cabosil in the hardening mixture was omitted. This mixture differed from that of Example No. 1 in that it poured readily, otherwise its properties were the same.

*Example No. 3*

In Example No. 3 the same ingredients set forth in Example No. 1 were employed except that copper powder was substituted for the steel powder. In this instance a powder having a greater apparent density was employed. Also 7 parts of Cabosil were used as a thickener. The result was in all ways comparable to that of Example No. 1 except that it was softer and had less tensile strength.

*Example No. 4*

In Example No. 4 the same ingredients set forth in Example No. 1 were employed except that iron filings were substituted for the steel powder of Example No. 1. Again substantially the same properties were exhibited in the end product.

*Example No. 5*

In Example No. 5 a finely divided aluminum powder was substituted for the steel powder of Example No. 1. In this case the bulk volume of the aluminum powder corresponded approximately to that of the steel powder in Example No. 1, but, of course, on a parts-by-weight basis the aluminum was substantially less; i.e., 50 parts aluminum to 20 parts resin. Also the particles were so light and their surface area was so great in relation to their weight that they actually performed the thickening function themselves, and no Cabosil was added. The resulting product was virtually the same as that of Example No. 1, except about 10% weaker in tensile strength, and its coefficient of thermal expansion was slightly greater.

*Example No. 6*

In Example No. 6 the same ingredients set forth in Example No. 1 were employed except that instead of steel powder, lead powder was added to the mixture. On a parts-per-weight basis 260 parts of lead were employed, although it will be understood that this actually represented approximately the same volumetric ratio of resin-to-metal as was employed in Example No. 1. In this case also more thickening agent was employed; i.e., 10 parts of Cabosil. The resulting product was in many ways the same as that of Example No. 1, but was lower in tensile and compression strengths, and substantially higher in impact strength.

*Example No. 7*

In Example No. 7 in place of the Epon 828 of Example No. 1 an epoxy resin sold by the Bakelite Company and called BR 18,794 was employed in the proportions given. This resin is believed to be the reaction product of epichlorohydrin and Bisphenol A. Also in place of the Cabosil a silica thickening agent called Santosel, sold by the Monsanto Chemical Company, was employed. The resulting product was in every way comparable to that of Example No. 1.

*Example No. 8*

In Example No. 8 the same ingredients employed in Example No. 1 are used in the same proportions except that the Cabsoil was omitted from the initial mixture. The resulting product was in many ways identical with that of the product of Example No. 1 except that it was substantially softer and exhibited less tensile strength.

*Example No. 9*

In Example No. 9 the ingredients of Example No. 1 were employed except that the 5.5 parts of Polyamid employed in the hardening mixture were replaced by 5.5 parts of Thiokol. Thiokol is a product sold by the Thiokol Corporation of Trenton, New Jersey, and I understand it to be an organic polysulfide liquid polymer which combines with the epoxy resin as an internal plasticizer in substantially the same manner as the Polyamid stated above in connection with Example No. 1. To all intents and purposes, the properties exhibited by Example No. 9 were the same as those given for Example No. 1.

*Example No. 10*

In Example No. 10, as in Example No. 9, the Polyamid was replaced in the same proportions by a product of the Hercules Powder Company called Rosin Amine D. I understand Rosin Amine D to be a dehydroabietylamine. The Rosin Amine D is likewise an internal plasticizer cooperating in the reaction in substantially the same manner as the Polyamid. Again the properties exhibited were substantially the same as those set forth for Example No. 1.

*Example No. 11*

In Example No. 11 the same ingredients set forth for Example No. 1 were employed except that carbon black was employed in place of Cabosil in the same proportions. A substantially identical product resulted.

*Example No. 12*

In Example No. 12 the same ingredients as those given in Example No. 1 were employed except that in place of the diethylene triamine, I employed triethylene tetramine in the same proportions. Its viscosity was slightly higher, but otherwise it performed in the same way as the diethylene triamine, bringing about a room temperature cure in about 1 hour and resulting in practically the same product. The triethylene tetramine did not give off fumes to the same extent as the diethylene triamine did.

It will be noted that the proportion of resin to metal is critical in the practise of my invention. Thus if a semicylindrical test sample having a radius of 1 inch and a length of 4.4 inches is molded with the ingredients of Example No. 1, but omitting the powdered steel, a brittle cured mass results exhibiting a linear shrinkage of 1.1%, a hardness reading of 58, and very poor machineability. Again if the same ingredients are employed except that 11 parts of steel powder are added, the linear shrinkage is .65% and the hardness reading 80, and the machineability only slightly improved. However, when the proportion of resin to steel reaches approximately equal parts, then the linear shrinkage drops rapidly to below .05% and in the proportions given in Example No. 1, the linear shrinkage is actually .023%, the hardness approximately 95, and the machineability excellent. In view of this, the lower critical limit of steel powder in the mixture is approximately 45% by weight. In terms of volume, this represents approximately 30% of the total bulk, and a metal to resin volumetric ratio of 32% to 68%. In practise, percentages and parts by weight are more convenient to use, but since these change depending on the apparent density of the type of metal powder employed, and since the volumetric ratios are substantially constant whether the metal powder is lead, copper, iron or aluminum, I prefer herein to claim these proportions in volumetric terms.

I have found that the best results are obtained when the steel comprises approximately 70%, the epoxy resin 24½%, and the thickening agent 4½% by weight of the starting mixture. I have found that a mixture of 5% epoxy resin and 95% steel will cure into a solid mass. However, the resulting structure is quite weak, and therefore, I regard the ratio of 5% resin to 95% steel by weight to be the upper critical limit of feasible proportions with my invention. The volumetric metal to resin proportion of this upper limit is 90% steel, 10% resin. This same volumetric metal-to-resin upper limit applies equally to copper, iron, aluminum and lead. 15% epoxy resin, 82% steel and 3% thickening agent by weight gives a satisfactory product, but it is slightly weaker than the optimum product and also has less ability to cohere to vertical surfaces during the curing stage. 45% epoxy resin, 45% steel and 10% thickener is a barely satisfactory proportion because it tends to sag during formation and is substantially weaker. However, it may still be considered a feasible material. 67% epoxy resin, 24% steel and 9% thickener is regarded as unsatisfactory because it does not contain sufficient steel to transfer the heat of polymerization from the interior of the formed article to the surface thereof. With these latter proportions swelling during polymerization and shrinkage thereafter, cracks and the like were observed. My experiments indicate that the lower limit of percentage of the steel is approximately 45% by weight of the total mass. With regard to the other percentages employed herein, it will be understood that the Polyamid may be increased or decreased and will be depending upon the desired properties of the finished product. The amine, however, should be fairly close to the percentage indicated in the preferred embodiment because it actually combines with the epoxy resin and if there is too little amine, the epoxy resin will not completely cure, and if there is too much amine, the finished article will contain a small amount of uncombined amine curing agent. Of course, minor variations of this percentage have no particularly undesirable effect. With regard to the percentage of additional thickening agent mixed into the material along with the Polyamid and amine, it will be understood that this proportion will naturally change as the various proportions of epoxy resin to metal to thickener in the starting mixture are changed. The principal object of adding the additional thickening agent to the starting mixture along with the curing and toughening agents is to render the final material sufficiently stiff to avoid sagging during formation, and the proportion thereof is a simple one to determine once the starting mixture proportions have been arrived at.

In regard to the various steps in the process of making the material of my invention, it should be noted, in the first instance, that the thickening agent of the starting mixture should be mixed in very slowly. If it is mixed in rapidly, it tends to cake and bunch, and the desired consistency of the starting mixture will not be attained.

It will be understood that the finished product will have somewhat different characteristics depending upon the type of metal employed, and in general where high strength is desired metals, such as aluminum, should not be used. When aluminum particles are used in the material of my invention, the resultant product is weaker than when steel filings are used.

The epoxy resin employed in the preferred embodiment of my invention is sold by the Shell Chemical Company under the designation "Epon 828." I find that another suitable resin is sold by the Bakelite Company under the designation "BR 18,794." Insofar as electrical resistance is concerned, I have tested the material of my invention by placing two nails therein an inch apart and find that the electrical resistance under these conditions is 1,000 ohms. However, an extremely interesting property of the material of my invention is that a groove may be scratched into the surface, and, presumably due to an overlapping of metal caused by such scratching, the path along the scratch will readily conduct electricity.

It will be understood that, although the proportions given herein for the preferred embodiments are in parts and percentages by weight, the types of metal and thickening agents will necessarily vary the optimum proportions by weight. Thus, for example, 70% by weight is the optimum for steel, but 94% by weight is the optimum for lead, and so forth. The volumetric proportions, however, remain relatively constant, at an optimum ratio of about 60% metal to 40% resin, from metal to metal provided the size and shape of the particles are also relatively the same. In general, the surfaces of the particles must be sufficiently covered with resin to permit adequate bonding, but on the other hand, the resin between the metal particles must be sufficiently thin to permit the metal to serve as a conductor of the heat of polymerization. In addition, the size and shape of the particles has an important bearing on the question of how much thickening agent must be employed. Thus with a very finely divided aluminum, the particles themselves may actually perform the thickening function. In general, the mixture should contain enough thickening agent to hold the mass in place while curing and to keep the metal particles in suspension in the starting mixture without making the mixture too thick to stir in the curing agent.

Generally speaking, a fibrous material is not suitable as a substitute for the finely divided metal because it will tend to render the material too stiff for convenient mixing and troweling. However, it is entirely feasible to reinforce the material of my invention with fibrous material either by applying the material directly to the fibers, laminating the fibers with the mixture, or by mixing fibers into the material prior to application.

Since numerous minor variations of my invention will now be apparent to those skilled in the art, it is not my intention to confine the invention to the precise form of the preferred embodiment herein shown, but rather to limit it in terms of the appended claims. Thus, while I have only specifically mentioned steel, iron, copper, aluminum and lead as the metals employed in the preferred embodiments, it is clear that other well known metals such as gold, silver, platinum, zinc, and the like and alloys of the same are suitable for my invention provided they are in the relatively pure elemental state and have generally the same properties of specific heat, conductivity and surface texture as elemental steel, iron, copper, aluminum and lead. Therefore, when I employ the term "metal" in the claims herein, I intend to include all such metals. Likewise, in the claims when I employ the term "internal plasticizer" I intend to include all materials of the general class of "Polyamid," "Thiokol" and "Rosin Amine D" described above, which materials combine with the resin and also impart toughness or flexibility to the finished product. I have made no effort, however, to list all such materials herein, because they are well known and their various uses and characteristics are common knowledge to those skilled in the art. Thus, while I regard the use of such reactive, internal plasticizers as critical in my invention, I do not regard my invention as limited to the use of any particular one. Moreover in connection with the room temperature curing agent I have stated that ethylene diamine, diethylene triamine, triethylene tetramine, and 3-diethyl amino propylamine are useful. These substances are all lower aliphatic polyamines, in which the reactive portions of the molecule are not surrounded by or impeded by adjacent atoms and therefore result in a room temperature curing system. Since all such lower aliphatic polyamines perform the room temperature curing function, I intend to claim them broadly as the curing agent employed in my invention.

Having thus described and disclosed preferred embodiments of my invention, what I claim as new and desire to secure by Letters Patent of the United States is:

1. A room temperature curing resinous molding and forming composition comprising: a mixture of finely divided metal particles and a liquid resin in a volumetric metal-to-resin ratio of approximately 32%–90% metal to 68%–10% resin; said metal being in the relatively pure elemental state and having characteristics of specific heat, thermal conductivity and surface texture of materials belonging to the class consisting of steel, iron, copper, aluminum and lead, said resin comprising a condensation product of bis-phenol and epichlorohydrin together with a room temperature curing agent therefor comprising a lower aliphatic polyamine, and a toughening agent; said curing agent being present in a quantity sufficient substantially completely to combine with and cure said resin, and said toughening agent having the characteristics of chemically combining with and toughening said resin of the class consisting in a condensation product of unsaturated fatty acid and polyalkyl amine, a liquid polythiodithiol polymer, and a dehydroabiethylamine; said metal being uniformly distributed throughout said resin; a thickening agent in said mixture comprising solid particles of finely divided, highly adsorptive material in quantity sufficient to hold said metal in suspension prior to said curing; and said mixture being 100% volatile free.

2. A room temperature curing resinous molding and forming composition comprising: a mixture of finely divided metal particles and a liquid resin in a volumetric metal-to-resin ratio of approximately 32%–90% metal to 68%–10% resin; said metal being in the relatively pure elemental state and having characteristics of specific heat, thermal conductivity and surface texture of materials belonging to the class consisting of steel, iron, copper, aluminum and lead, said resin comprising a condensation product of bis-phenol and epichlorohydrin together with a curing agent having the characteristic of combining with and curing said resin at room temperature of lower aliphatic amines of the class consisting in ethylene diamine, diethylene triamine, triethylene tetramine, and 3-diethyl amino propyl amine, and a toughening agent; said curing agent being present in a quantity sufficient substantially completely to combine with and cure said resin, and said toughening agent having the characteristics of chemically combining with and toughening said resin of the class consisting in a condensation product of unsaturated fatty acid and polyalkyl amine, a liquid polythiodithiol polymer, and a dehydroabiethylamine; said metal being uniformly distributed throughout said resin; a thickening agent in said mixture comprising solid particles of finely divided, highly adsorptive material in quantity sufficient to hold said metal in suspension prior to said curing; and said mixture being 100% volatile free.

References Cited in the file of this patent

UNITED STATES PATENTS

| | | |
|---|---|---|
| 2,528,933 | Wiles | Nov. 7, 1950 |
| 2,707,708 | Wittcoff | May 3, 1955 |
| 2,773,048 | Formo et al. | Dec. 4, 1956 |
| 2,774,747 | Wolfson et al. | Dec. 18, 1956 |
| 2,788,337 | Preiswerk et al. | Apr. 9, 1957 |
| 2,901,455 | Jurras | Aug. 25, 1959 |

OTHER REFERENCES

Chatfield: Paint Technology, July 1952, vol. 17, No. 199, p. 289, column 2.